(12) United States Patent
Hayashi

(10) Patent No.: US 7,204,621 B2
(45) Date of Patent: Apr. 17, 2007

(54) VEHICLE PROVIDED WITH INCLINATION SENSOR

(75) Inventor: Kenji Hayashi, Tokyo (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 128 days.

(21) Appl. No.: 10/939,951

(22) Filed: Sep. 13, 2004

(65) Prior Publication Data

US 2005/0088290 A1 Apr. 28, 2005

(30) Foreign Application Priority Data

Sep. 12, 2003 (JP) ............................. 2003-322299

(51) Int. Cl.
*B60Q 1/00* (2006.01)
(52) U.S. Cl. ...................... 362/466; 362/465
(58) Field of Classification Search ................ 362/464, 362/465, 466, 467, 802; 200/51 A, 61.52
See application file for complete search history.

(56) References Cited

U.S. PATENT DOCUMENTS

| 5,182,460 A | 1/1993 | Hussman |
| 5,896,011 A * | 4/1999 | Zillgitt .................... 315/82 |
| 5,907,196 A | 5/1999 | Hayami et al. |
| 5,920,046 A * | 7/1999 | Takagi ..................... 200/61.48 |
| 6,234,654 B1 * | 5/2001 | Okuchi et al. ............... 362/466 |
| 6,302,553 B1 * | 10/2001 | Izawa .......................... 362/37 |
| 6,480,806 B1 * | 11/2002 | Bilz et al. .................... 702/154 |
| 2001/0020389 A1 * | 9/2001 | Nishimoto et al. ........... 73/579 |
| 2003/0090960 A1 * | 5/2003 | Kayano et al. ................ 367/96 |

FOREIGN PATENT DOCUMENTS

| JP | 2003-127757 A | | 5/2003 |
| JP | 2003127757 A | * | 5/2003 |

\* cited by examiner

*Primary Examiner*—Renee Luebke
*Assistant Examiner*—Julie A. Shallenberger
(74) *Attorney, Agent, or Firm*—Rossi, Kimms & McDowell, LLP

(57) ABSTRACT

To prevent an inclination sensor of a vehicle from becoming soiled by flying matter such as muddy water splashes scattered by the rotating wheels of the vehicle itself, which may result in false detection of the inclination of the vehicle to a road surface, a vehicle provided with an inclination sensor for detecting the inclination of vehicle to road surface is proposed, wherein the sensor is attached onto the undersurface of the vehicle at a position between the wheels in the direction of the width of the vehicle, and a cover member having at least either of a side cover portion for covering the wheel side of the inclination sensor or a rear side portion for covering the rear side of the inclination sensor in the longitudinal direction of the vehicle is provided.

9 Claims, 6 Drawing Sheets

VEHICLE PROVIDED WITH INCLINATION SENSOR

BACKGROUND OF THE INVENTION

1. Field of the Invention

The present invention is related to a vehicle provided with an inclination sensor for detecting the state of inclination of the vehicle, particularly provided with an inclination sensor provided with a cover member for intercepting flying matter such as a splash of muddy water which may run into the inclination sensor.

2. Description of the Related Art

In recent years, in a heavy vehicle such as a truck provided with a headlight of high brightness, a light axis adjusting device is provided. This device adjusts the light axis automatically in accordance with the tilt of the vehicle to a road surface, which is detected by an inclination sensor, in order to prevent the driver of an oncoming car from being dazzled by the strong light.

One such light axis adjusting device is disclosed in Japanese Laid-Open Patent Application No. 2003-127757 (hereafter referred as patent literature 1). According to the art disclosed in patent literature 1, two pairs of an ultrasonic wave radiator and a detector are located along the longitudinal direction of the vehicle with a certain distance apart from each other, each pair consisting of an ultrasonic wave radiator for radiating an ultrasonic wave toward a road surface and a detector for detecting the ultrasonic wave reflected from the road surface to compose a radiator-detector couple. The radiator and detector are located along the direction of width of the vehicle with a certain distance from each other. The radiators and detectors are connected to a controller. The inclination of the vehicle to the road surface is calculated based on the time difference between the time needed from the radiating ultrasonic wave to the detection of the reflected ultrasonic wave by means of a pair of radiator and detector located in the front side and the time needed from the radiation of the ultrasonic wave to the detection of the reflected ultrasonic wave by means of another pair of radiator and detector located in the rear side. The controller allows the light axes of head lamps to be changed according to the inclination of the vehicle detected.

Further, according to the art disclosed in patent literature 1, said two pairs of ultrasonic wave sensors are mounted to a box-like case so that the radiating faces and detecting faces of the sensors are exposed toward the road surface, and the case mounted with the sensors is attached to the central part of the cross member of the vehicle frame. Because of this, the space in the longitudinal direction of the vehicle required for attaching the case is decreased, and a compact inclination sensor is achieved by accommodating the sensors in the case.

SUMMARY OF THE INVENTION

Since the inclination sensor of patent literature 1 is composed such that the two pairs of the ultrasonic wave radiators and detectors are attached to the case, and the radiating and detecting faces thereof are exposed to the road surface, the radiating and detecting faces of the ultrasonic wave radiators and detectors are apt to be soiled by flying matter. Such flying matter might be a splash of muddy water scattered by the rotating wheels of the running vehicle itself, or muddy water curled up by the front running cars.

The present inventors ascertained that there are two kinds of contamination of the radiating faces of radiators and the detecting faces of detectors. One type is the contamination by a splash phenomenon in which muddy water splashed by the front wheels impinges directly against the radiating faces and detecting faces. Another type is the contamination due to a spray phenomenon in which the muddy water splashed by the tires of the front wheels crashes into small particles as a consequence of an impingement against the wheel houses (or by the rotation of the front wheels), and further spreads between the tires and wheel houses like sprayed muddy water, whereby the sprayed muddy water is conveyed by a stream produced by the rotation of the wheels and adheres to the radiating faces and detecting faces.

Conventionally, as disclosed in patent literature 1, no countermeasure is devised for preventing the inclination sensor from being contaminated by the splashing and spraying phenomena as mentioned above. Since muddy water splashing onto the inclination sensor is not prevented, the radiating and detecting faces of the ultrasonic wave radiators and detectors are apt to be soiled. This can cause false detection of the inclination of the vehicle to the road surface.

Therefore, in light of the problem of the prior art, the object of the present invention is to provide a vehicle provided with an inclination sensor which does not become contaminated by flying matter, and hence does not provide a false detection of the inclination of the vehicle to the road surface.

The present invention provides a vehicle provided with an inclination sensor for detecting an inclination of vehicle to the road surface, wherein said sensor is attached onto the undersurface of the vehicle at a position between the wheels in the direction of the width of the vehicle, and a cover member having at least either a side cover portion for covering the wheel side of the inclination sensor or a rear side portion for covering the rear side of the inclination sensor is provided.

According to the invention, flying matter, such as muddy water splash produced by said splash phenomenon, is prevented from impinging directly upon the radiating faces of the radiators and the detecting faces of the detectors of the ultrasonic wave sensor mainly by the side cover portion covering the front wheel side of the ultrasonic wave sensor. The contamination by the spray phenomenon in which muddy water spray spreads between the front tires and wheel houses is prevented from coming around toward the radiating faces of the radiators and the detecting faces of the detectors of the ultrasonic wave sensor by virtue of said side cover portion and the rear side cover portion for covering the rear side of the ultrasonic wave sensor.

With respect to the cover member, it is possible that either the side cover portion or the rear cover portion is provided, although preferably only the side cover portion is provided.

In the present invention, it is preferable that the cover member is provided with a front cover portion for covering the front side of the inclination sensor. With the configuration like this, flying matter such as a muddy splash spreading in the space between the wheels and wheel houses can be prevented from coming around the front side of the ultrasonic wave sensor to the radiating faces of the radiators and the detecting faces of the detectors of the ultrasonic wave sensor by the front cover portion covering the front side of the ultrasonic wave sensor. Further, the splashes caused by front running cars can be intercepted.

In the present invention, it is preferable that said inclination sensor is fixed to the vehicle by a bracket to which said cover member is attached detachably. With the configuration like this, it is easy to remove the cover member from the bracket so that the ultrasonic wave sensor and the cover can be cleaned and again attached. When the cover is damaged, the cover can be replaced easily.

In the present invention, it is preferable that said inclination sensor is an ultrasonic wave sensor comprising ultrasonic wave radiators for radiating the ultrasonic wave, ultrasonic wave detectors for detecting the ultrasonic wave, and a case in which said ultrasonic wave radiators and ultrasonic wave detectors are mounted; said case is formed to have conically shaped parts which broaden in diameter from each of the ultrasonic wave radiators and detectors toward the road surface. The cover member is located such that the lower end thereof does not interfere with each of the extension of the conically shaped parts. With the configuration like this, the cover member can intercept flying matter without interfering with the ultrasonic wave radiated from the ultrasonic wave sensor, so accurate detection of the inclination of the vehicle by means of the ultrasonic wave sensor is possible by preventing the contamination of the inclination sensor.

Further, it is preferable that a head lamp controller is provided for controlling the light axes of the head lamps of the vehicle.

BRIEF DESCRIPTION OF THE DRAWINGS

The invention will be described with reference to certain preferred embodiments thereof along with the accompanying drawings, wherein.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only and not as limitative of the scope of the present invention.

Figure 1:
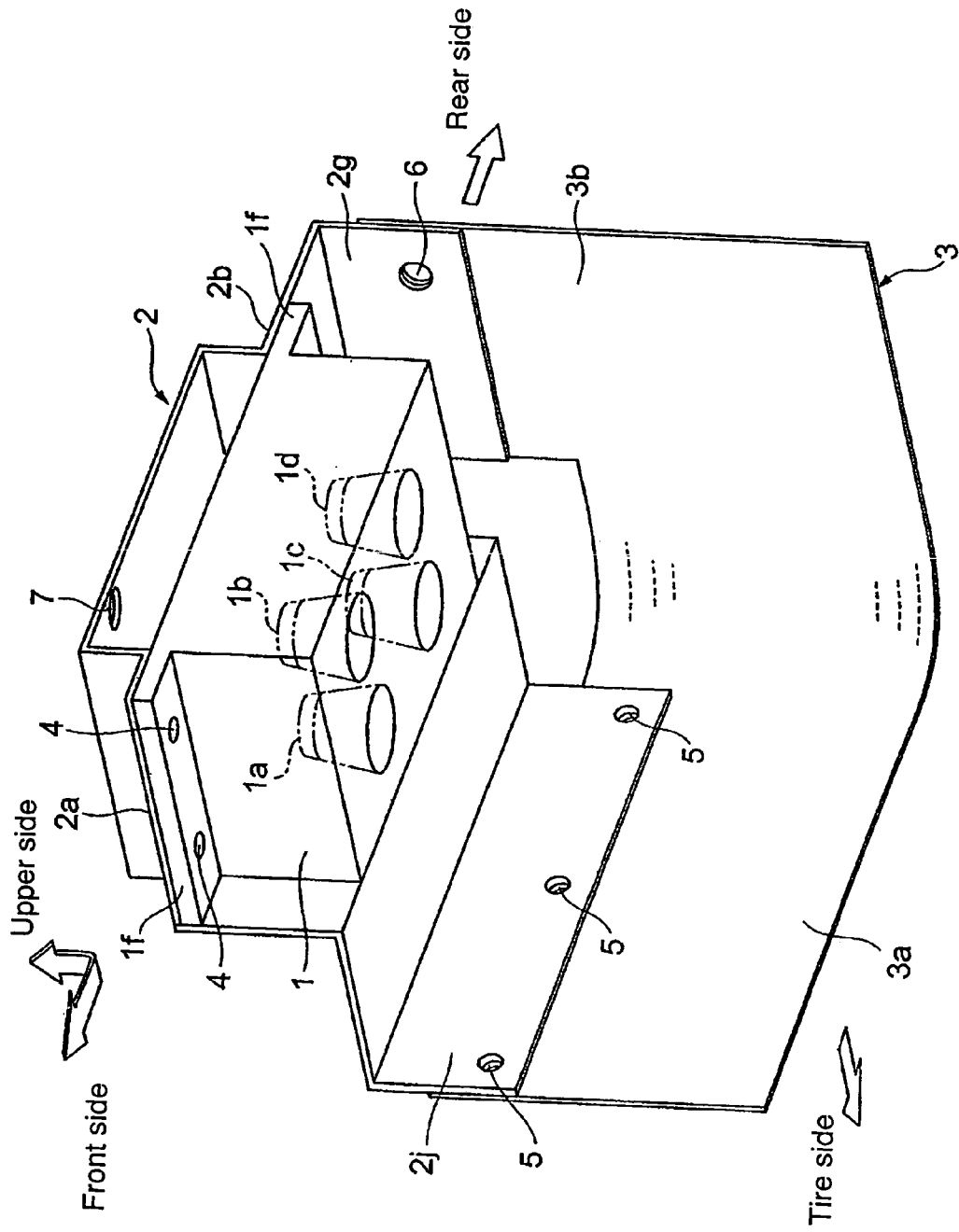
FIG. 1 is a perspective view showing the ultrasonic wave sensor, the bracket and the cover for intercepting splashes of the first embodiment.
Figure 2A:
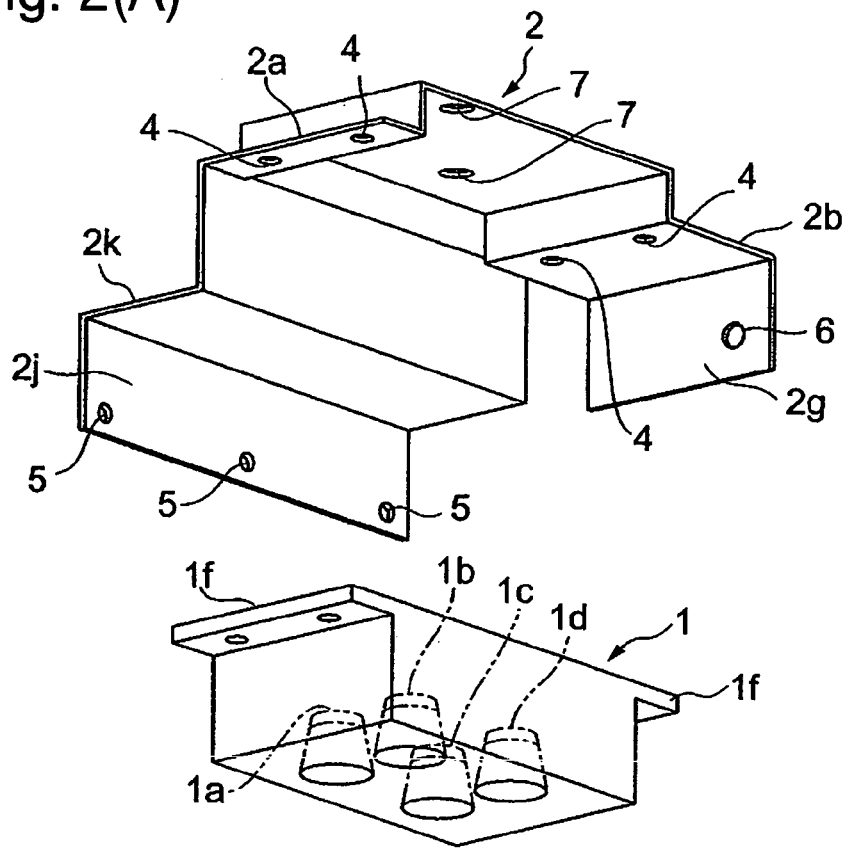
FIG. 2(A) is an exploded view of the bracket and the cover for intercepting splashes.
Figure 2B:
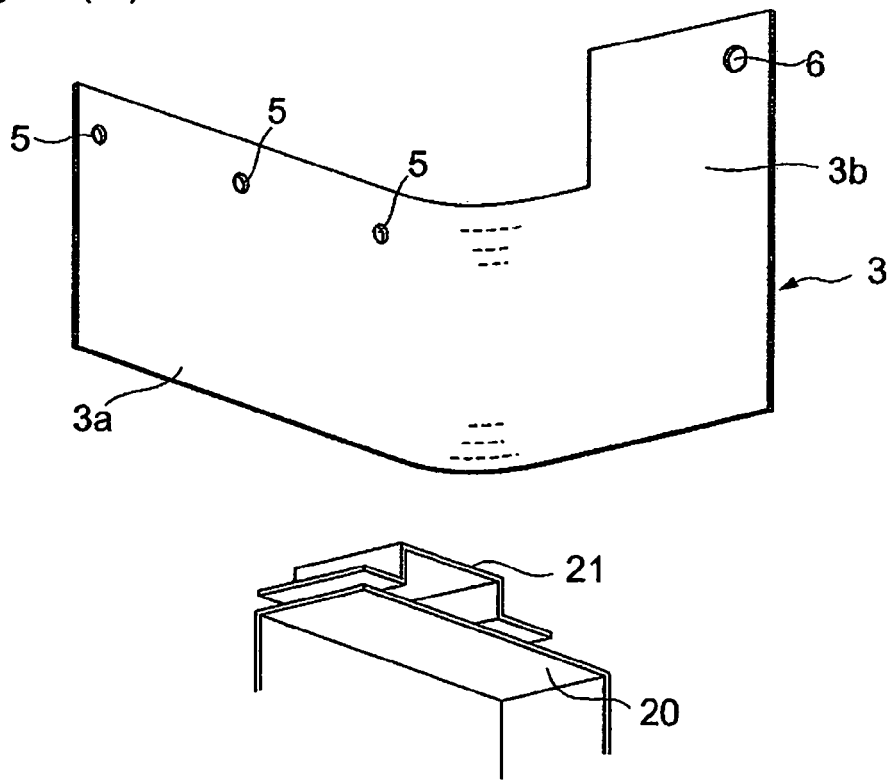
FIG. 2(B) is a perspective view of another embodiment of the bracket.
Figure 3:
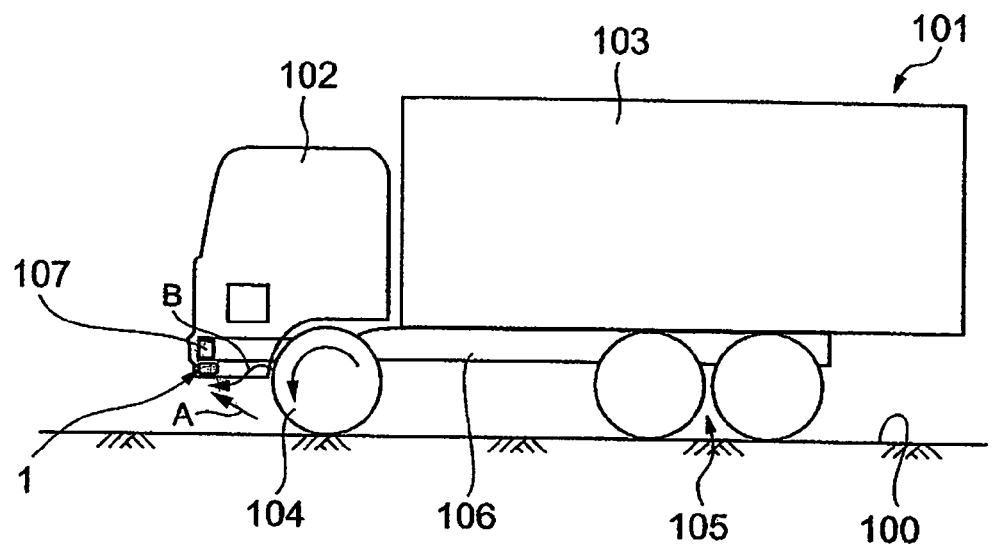
FIG. 3 is a side view of the heavy truck to which the present invention is applied.
Figure 4:
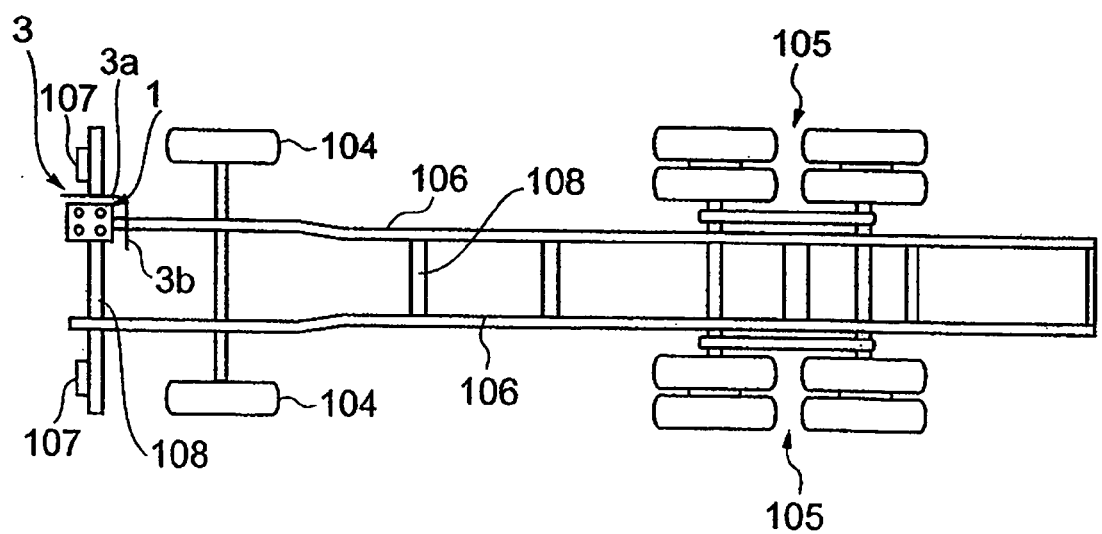
FIG. 4 is a plan view of the chassis of the heavy truck of FIG. 3.
Figure 5A:
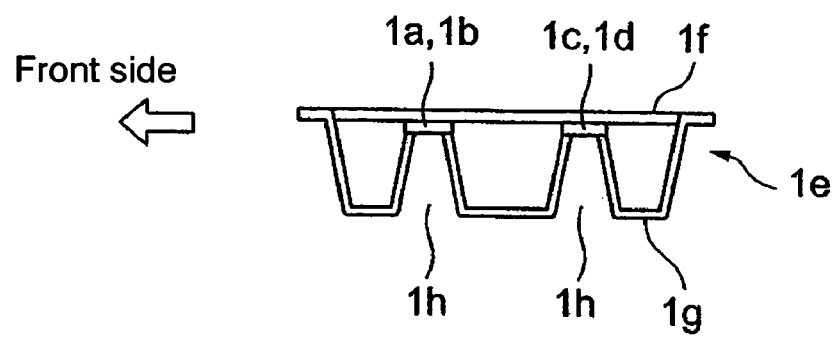
FIG. 5(A) is a sectional side elevation of the ultrasonic wave sensor.
Figure 5B:
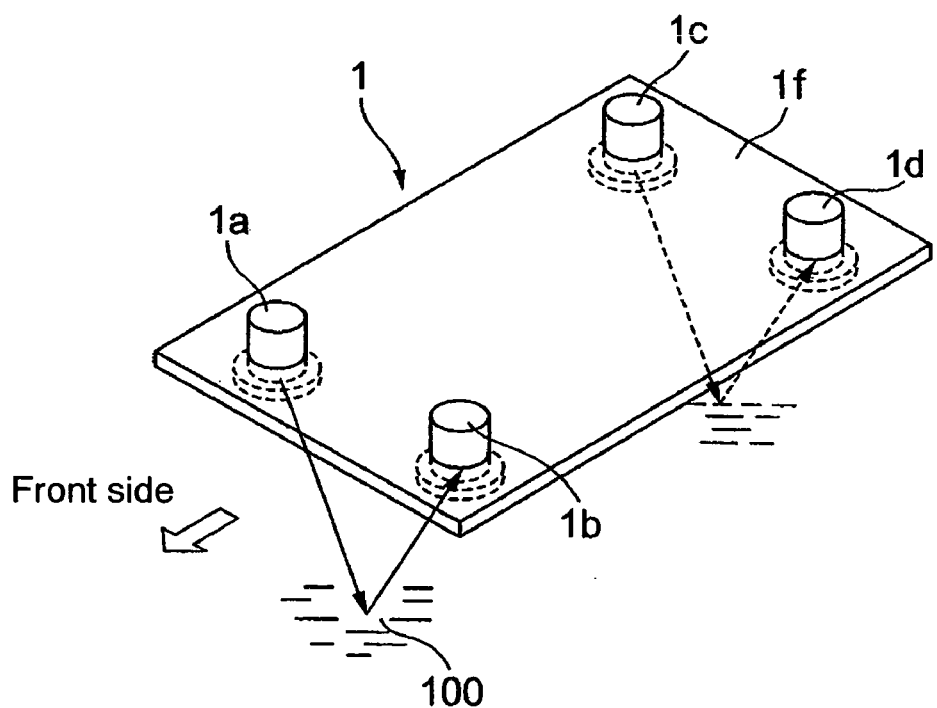
FIG. 5(B) is a perspective view of the ultrasonic wave sensor viewed from above.
Figure 6:
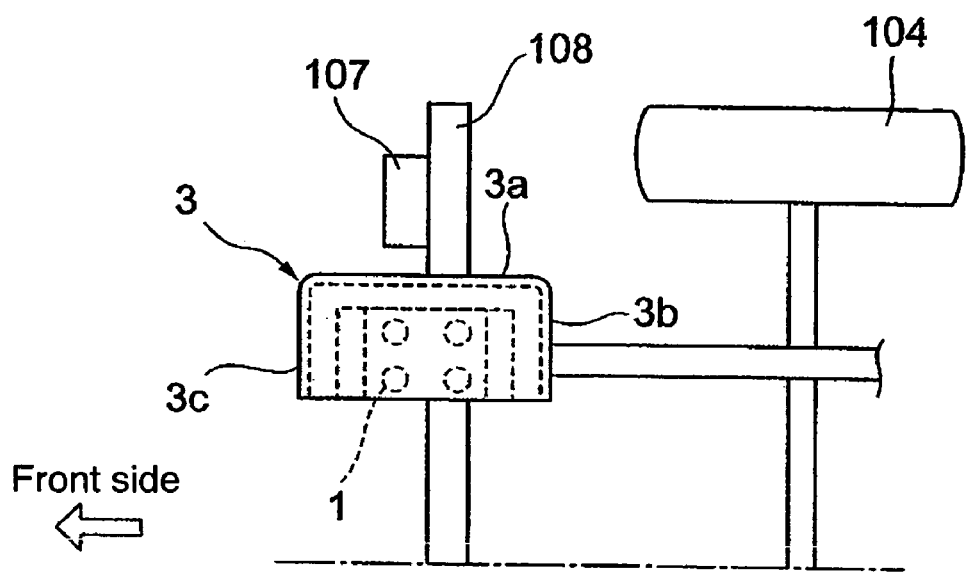
FIG. 6 is a partial plan view showing the inclination sensor with the cover of the second embodiment of the invention fixed to the front part of the vehicle.
Figure 7:
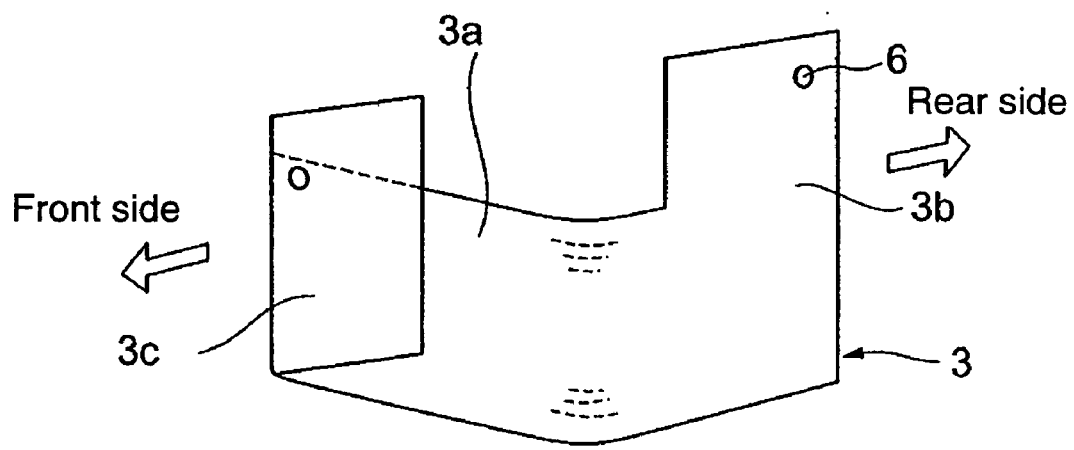
FIG. 7 is a perspective view of the cover of the second embodiment of the invention.
Figure 8A:
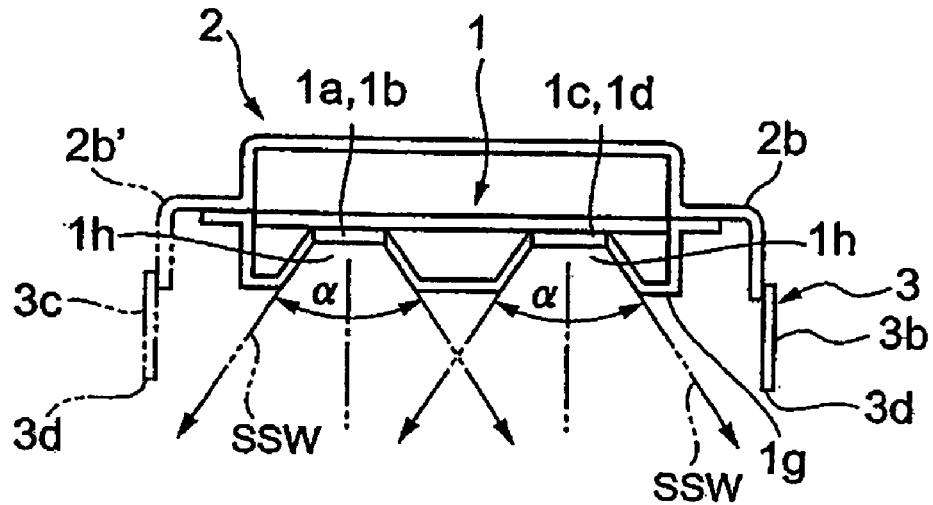
FIG. 8(A) and FIG. 8(B) are drawings illustrating the relative positions of the ultrasonic wave path and the cover.
Figure 8B:
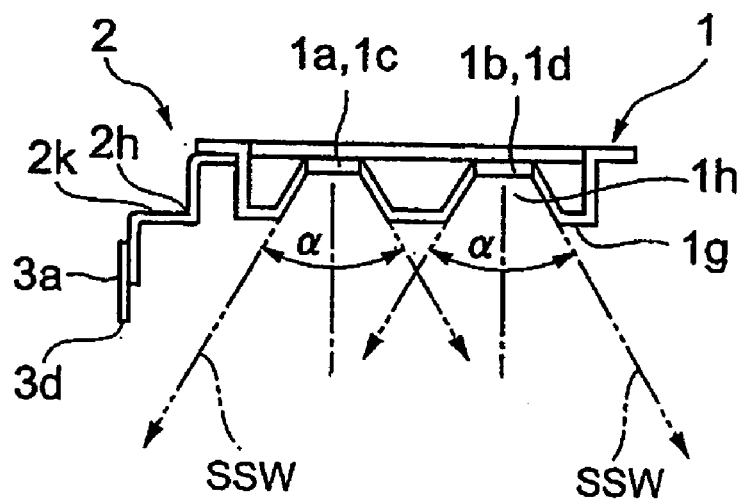

FIG. 1 is a perspective view showing the ultrasonic sensor, the bracket and the cover for intercepting splashes of the first embodiment. FIG. 2(A) is an exploded view of the bracket and the cover for intercepting splashes, and FIG. 2(B) is a perspective view of another embodiment of the bracket. FIG. 3 is a side view of the heavy truck to which the present invention is applied. FIG. 4 is a plan view of the chassis of the heavy truck of FIG. 3. FIG. 5(A) is a sectional side elevation of the ultrasonic wave sensor, and FIG. 5(B) is a perspective view of the of the ultrasonic wave sensor viewed from above. FIG. 6 a partial plan view showing the inclination sensor with the cover of the second embodiment of the invention, where the inclination sensor with the cover is fixed to the front part of the vehicle. FIG. 7 is a perspective view of the cover of the second embodiment of the invention. FIG. 8(A) and FIG. 8(B) are drawings for explaining the relation of position of the ultrasonic wave path and the cover.

Referring to FIG. 3 and FIG. 4, which show an embodiment of the heavy truck provided with the inclination sensor according to the present invention, numeral reference 101 is a vehicle (truck), 102 is the cab of the vehicle 102, 103 is a load-carrying platform, 104 are front wheels, 105 are rear wheels, 106 are side frames, and 108 are cross members. Reference numerals 107 are head lamps of which the directions of light axes are adjustable. Reference numeral 1 is an ultrasonic inclination sensor, of which the detail is explained later, for detecting the inclination of vehicle.

The inclination sensor 1 is located at an inner side from the right front wheel 104 and attached to the undersurface of the front cross member 108 (not necessarily the undersurface of the front cross member, the undersurface of the vehicle frame is permissible) by means of a bracket 2 (see FIGS. 1, 2). Reference numeral 3 is a cover member consisting of a side cover 3a and a rear cover 3b, of which the details are explained later. The inclination sensor 1 may be a laser sensor comprising laser beam radiators and detectors.

The composition of the inclination sensor 1 will be explained by referring to FIG. 5(A) hereafter. The ultrasonic inclination sensor 1 comprises a case 1e (see FIG. 5(A)), radiators 1a and 1c, and detectors 1b and 1d. A radiator 1a and a detector 1c work as a pair, and a radiator 1b and a detector 1d work as a pair. Two pairs of radiators and detectors are provided. A radiator and a detector of one pair are located along the lateral direction of the vehicle so that the ultrasonic wave radiated from a radiator 1a toward the road surface 100 and reflected therefrom is detected by a detector 1b, and the ultrasonic wave radiated from a radiator 1c toward the road surface 100 and reflected therefrom is detected by a detector 1d. The two pairs are located along the longitudinal direction of the vehicle with a certain distance apart from each other. The radiators 1a and 1c and detectors 1b and 1d are attached to the case 1 at the base part if thereof so that both the radiating faces and the detecting faces of the radiators and detectors, respectively, face toward the road surface 100. The base part if where the radiators 1a and 1c and detectors 1b and 1d are attached is covered by a case body 1g. Conically shaped parts 1h broadening in diameter toward the road surface 100 are formed in the case body 19. The downward broadening parts 1h are provided for each of the radiators 1a and 1c and the detectors 1b and 1d. The bottom (i.e. radiator or detector side) of each of the conically shaped parts 1h which broaden downward contact the peripheral part of each of the radiators 1a and 1c and the detectors 1b and 1d. With this configuration, the ultrasonic wave emanates along the surface of the conically shaped parts 1h which broaden downward. The broadening angle α of the conically shaped part 1h is 120° in the embodiment as shown in FIG. 8, and the diffusion of the ultrasonic wave emanating from the radiator 1a and 1c is defined in the range of the cone angle α. The ultrasonic wave radiated from each of the radiators 1a and 1c and reflected from the road surface 100 is detected by each of the detectors 1b and 1d respectively. Signals from the radiators and detectors are inputted into a controller, which is not shown in the drawings. The controller detects the inclination of the vehicle to the road surface 100 based on the inputted signals and allows the light axes of the head lamps 107 to be adjusted according to the result of the detection. Therefore, the light axes of the head lamps 107 can be adjusted most suitably in accordance with the state of inclination of the vehicle.

FIG. 5(B) is a representation showing the location of the radiators 1a and 1c and the detectors 1b and 1d, and also showing the state of the ultrasonic waves which are radiated and reflected. The ultrasonic wave sensor 1 is provided with a radiator 1a and a detector 1b in the front side and a radiator 1c and a detector 1d in the rear side along the longitudinal direction of the vehicle so that the inclination of the vehicle to the road surface is calculated based on the time difference between the time needed from the radiation of the ultrasonic wave to the detection of the reflected ultrasonic wave by means of a radiator and a detector located in the front side and the time needed from the radiation of the ultrasonic wave to the detection of the reflected ultrasonic wave by means of a radiator and detector located in the rear side.

The ultrasonic sensor, bracket and cover for preventing splash of the first embodiment of the invention will be explained referring to FIG. 1 and FIG. 2. In the drawings, reference numeral 2 is a bracket made of a thin steel plate formed into a box-like shape. The bracket 2 is fixed to the undersurface of the front cross member 108 by the upper face of the bracket by means of a plurality of bolts 7. It may be fixed to a proper position of the vehicle frame and is not limited to the front cross member. To the undersurface of the flange part 2a and 2b of the bracket 2 is fixed the ultrasonic wave sensor 1 by the base part 1f formed at the upper part of the case 1e by means of a plurality of bolts 4. The bracket 2 may be divided into an upper bracket 21 and a lower bracket 20 as shown in FIG. 2(B).

Reference numeral 3 is a cover made of a rubber plate (elastomer, resin, or thin steel plate is permissible) having a side cover portion 3a for covering the front wheel side of the ultrasonic wave sensor 1 and a rear cover portion 3b continuing to the side cover portion 3a to cover the rear side of the ultrasonic wave sensor 1. The cover 3 is attached to the bracket 2 detachably such that the side cover portion 3a is attached to the cover attaching part 2j of the bracket 2 by means of a plurality of bolts 5 (three bolts in this example), and the rear cover portion 3b is attached to the cover attaching part 2g of the bracket 2 by means of a bolt 6 or a plurality of bolts (one bolt in this example). By attaching the cover 3 detachably to the lower part of the bracket 2 for fixing the ultrasonic wave sensor 1 to the vehicle frame, it is easy to remove only the cover 3 from the bracket for fixing the ultrasonic wave sensor 1 when the cover is soiled by splashes of muddy water without removing other members, and the cover can be cleaned and again attached. When the cover is damaged, the cover can be replaced easily.

The present inventors ascertained that there are two kinds of contamination of the radiating faces of the radiators 1a and 1c and the detecting faces of the detectors 1b and 1d. One is the contamination by a splash phenomenon in which muddy water from a pool or puddle splashed by the front wheels 104 impinges directly against the radiating faces and detecting faces and soils the faces as shown by arrow A in FIG. 3. Another is the contamination by a spray phenomenon in which the muddy water splashed by the tires of the front wheels 104 separates into small particles by an impingement against the wheel houses or by the rotation of the front wheels 104, which spreads between the tires and the wheel houses like sprayed muddy water, whereby this muddy water spray is conveyed by the stream produced by the rotation of the wheels and further adheres to the radiating faces and detecting faces, soiling the faces as shown by arrow B in FIG. 3.

In the first embodiment of the invention, the cover 3 has a side cover portion 3a for covering the front wheel side of the ultrasonic wave sensor 1 and a rear cover portion 3b continuing to the side cover portion 3a to cover the rear side of the ultrasonic wave sensor 1, flying matter is prevented from impinging directly upon the radiating faces of the radiators and the detecting faces of the detectors of the ultrasonic wave sensor 1 mainly by the side cover portion 3a covering the front wheel side of the ultrasonic wave sensor 1. The contamination due to the spray phenomenon in which muddy water spray spreads between the front tires and wheel house is prevented from coming around toward the radiating faces of radiators and the detecting faces of detectors of the ultrasonic wave sensor 1 by virtue of said side cover portion 3a and the rear side cover portion 3b for covering the rear side of the ultrasonic wave sensor 1.

By virtue of the interception of flying matter such as muddy water splashes by the cover 3, the radiating faces of radiators and the detecting faces of detectors of the ultrasonic wave sensor 1 are prevented from being soiled by the flying matter, and hence the occurrence of false detection of the inclination of the vehicle due to contamination of the radiating faces of the radiators and the detecting faces of the detectors is prevented, and proper adjustment of the light axes of head lamps is always possible. With respect to the cover 3, it is permissible that either the side cover portion 3a or the rear cover portion 3b is provided, but preferably only the side cover portion 3a is provided.

In the second embodiment shown in FIG. 6 and FIG. 7, a front cover portion 3c for covering the front side of the ultrasonic wave sensor 1 is provided to said cover 3, in addition to the side cover portion 3a for covering the front wheel side of the ultrasonic wave sensor 1, the rear cover portion 3b for covering the rear side of the ultrasonic wave sensor 1, the side cover portion 3a and rear cover portion 3b, and the front cover portion 3c are continued to form a general shape of a sideways letter "U." In the second embodiment, flying matter such as a muddy splash spreading in the space between the front wheels and wheel houses is prevented from coming around the front side of the ultrasonic wave sensor 1 to the radiating faces of radiators and the detecting faces of the detectors of the ultrasonic wave sensor 1 by the front cover portion 3c covering the front side of the ultrasonic wave sensor 1. Further, the splashes caused by front running cars can be intercepted.

In the first and second embodiments, the cover 3 attached to the bracket 2 is formed, as shown in FIG. 8(A), which is a longitudinal sectional view, such that the cover 3 does not intercept the path of the ultrasonic waves SSW radiated from the radiator 1a, 1c and the ultrasonic wave SSW detected by the detector 1b, 1d which are defined by the downwardly broadening conically shaped parts 1h of the case body 1g (in the embodiments, broadening angle α=120°). The bracket 2b is formed such that the flange part 2b thereof is positioned offsetting rearward in the vehicle so that the lower end 3d of the rear cover portion 3b of the cover 3 is positioned higher than the path of the ultrasonic wave indicated by double dashed line SSW. The height of the rear cover portion 3b is adjusted similarly. In the second embodiment, similarly the flange 2b of the bracket 2 is positioned offsetting forward in the vehicle so that the lower end 3d of the front cover portion 3c of the cover 3 is positioned higher than the path of the ultrasonic wave indicated by the double dashed line SSW. The height of the front cover portion 3c is adjusted similarly.

With respect to the side portion 3a of the cover 3 attached to the bracket 2, as shown in FIG. 8(B), the cover 3 does not intercept the path of the ultrasonic waves SSW which are defined by the downwardly broadening conically shaped parts 1h of the case body 1g and broadening angle α=120° similarly as mentioned above referring to FIG. 8(A). The bracket 2 is formed such that the flange part 2k and the corner thereof 2h are positioned offsetting sideward (toward the wheel) in the vehicle so that the lower end 3d of the side cover portion 3a of the cover 3 is positioned higher than the path of the ultrasonic wave indicated by the double dashed line SSW. The height of the side cover portion 3a is adjusted similarly. This is the same also in the case of the second embodiment.

Such a configuration allows the ultrasonic wave SSW radiated from the ultrasonic wave sensor 1 not to interfere with the cover 3 or bracket 2, so accurate detection of the inclination of the vehicle by means of the ultrasonic wave sensor 1 is possible by preventing the contamination of the inclination sensor. Further, flying matter is intercepted by the cover 3, and the ultrasonic wave sensor 1 can be kept clean.

According to the present invention, flying matter such as muddy water scattered by the rotating wheels of the running vehicle itself are prevented from advancing toward the ultrasonic wave sensor, contamination caused by impingement of the flying matter against the radiating faces of ultrasonic wave radiators and the detecting faces of ultrasonic wave detectors are prevented, and hence false detection of the inclination of the vehicle due to such contamination can be evaded, and appropriate adjustment of the light axes of head lamps is made possible. By adjusting the light axes of the head lamps based on the output of the inclination sensor, accurate control of the axes of the head lamps is possible.

What is claimed is:

1. A vehicle provided with an inclination sensor for detecting an inclination of the vehicle to a road surface, wherein said sensor is attached onto an undersurface of the vehicle at a position between the wheels in a direction of a width of the vehicle, and a cover member having at least either of a side cover portion for covering the wheel side of the inclination sensor or a rear side portion for covering the rear side of the inclination sensor is provided, wherein the cover member is configured to permit radiation from the sensor to be reflected from the road surface, wherein said cover member is provided with a front cover portion for covering the front side of the inclination sensor.

2. The vehicle provided with an inclination sensor according to claim 1, wherein said inclination sensor is fixed to the vehicle by a bracket to which said cover member is attached detachably.

3. The vehicle provided with an inclination sensor according to claim 2, wherein said inclination sensor is an ultrasonic wave sensor comprising ultrasonic wave radiators for radiating an ultrasonic wave, ultrasonic wave detectors for detecting the ultrasonic wave, and a case in which the ultrasonic wave radiators and ultrasonic wave detectors are mounted; the case is formed to have conically shaped parts, each broadening in diameter from each of the ultrasonic wave radiators and detectors toward the road surface, and said cover member is located such that the lower end thereof does not interfere with each of the extension of the conically shaped parts.

4. The vehicle provided with an inclination sensor according to claim 1, wherein a head lamp controller is provided for controlling the light axes of the head lamps of the vehicle.

5. The vehicle provided with an inclination sensor according to claim 1, wherein said inclination sensor is a laser sensor.

6. The vehicle provided with an inclination sensor according to claim 3, wherein two pairs of ultrasonic wave radiators and ultrasonic wave detectors are attached to said case, each pair consisting of an ultrasonic wave radiator and an ultrasonic wave detector.

7. The vehicle provided with an inclination sensor according to claim 3, wherein said downward broadening part is formed to have a broadening angle of 120°.

8. The vehicle provided with an inclination sensor according to claim 1, wherein said inclination sensor is fixed to the vehicle by a bracket to which said cover member is attached detachably.

9. The vehicle provided with an inclination sensor according to claim 3, wherein a head lamp controller is provided for controlling the light axes of the head lamps of the vehicle.

* * * * *